No. 809,035. PATENTED JAN. 2, 1906.
W. I. THOMAS.
GOLF BALL.
APPLICATION FILED MAY 8, 1905.

Witnesses:
H. S. Gaither
Bertha Nathanson

Inventor:
William I. Thomas
by Chamberlin & Wilkinson
Attorneys

UNITED STATES PATENT OFFICE.

WILLIAM I. THOMAS, OF CHICAGO, ILLINOIS.

GOLF-BALL.

No. 809,035.      Specification of Letters Patent.      Patented Jan. 2, 1906.

Application filed May 8, 1905. Serial No. 259,320.

*To all whom it may concern:*

Be it known that I, WILLIAM I. THOMAS, a citizen of the United States, residing at Chicago, county of Cook, State of Illinois, have invented a certain new and useful Improvement in Golf-Balls; and I declare the following to be a full, clear, and exact description of the invention, such as will enable others skilled in the art to which it pertains to make and use the same, reference being had to the accompanying drawings, which form a part of this specification.

My invention relates in general to outdoor game apparatus, and more particularly to golf-balls.

It is desirable that golf-balls should be so constructed that by receiving a hard blow they will be driven the greatest possible distance, while a light blow, as in "approaching" or "putting," will result in an advance of only a comparatively short distance.

The primary object of my invention is to provide a golf-ball possessing maximum resiliency when a hard blow is delivered thereon and which will be comparatively non-resilient when struck lightly.

A further object of my invention is to provide a golf-ball which will be capable of withstanding hard blows without permanent distortion and with a minimum liability of fracture of the cover.

A still further object of my invention is to provide a golf-ball which will be simple in construction, comparatively inexpensive in manufacture, and efficient and durable in use.

My invention as herein disclosed may be generally described as consisting in a golf-ball having a center piece, a core surrounding the center piece, and composed of layers of elastic material, the inner and outer layers being under great tension and the intermediate layer being under a relatively less tension and a cover surrounding the core.

My invention will be more fully described hereinafter with reference to the accompanying drawings, in which the same is illustrated as embodied in an efficient and practical form, and in which—

Figure 1:
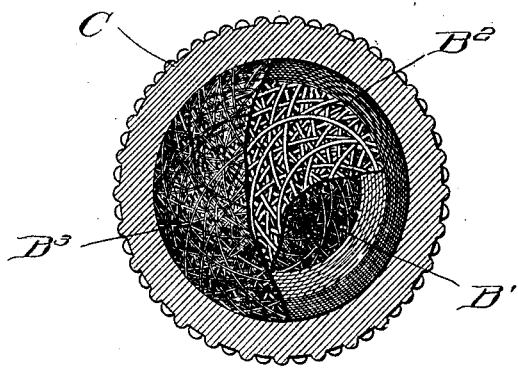
Figure 2:
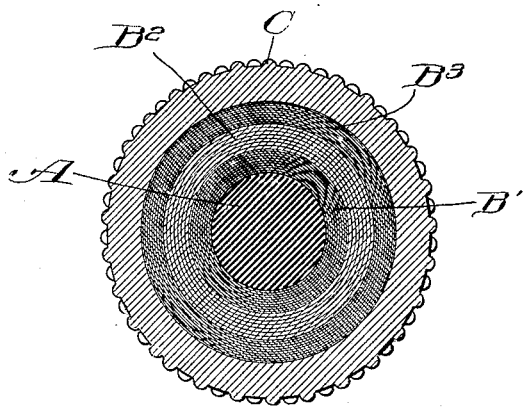

Figure 1 is a central sectional view, portions of the core-windings being shown in elevation; and Fig. 2, a central sectional view, the core-windings being diagrammatically shown to indicate different tensions.

The same reference characters are used to designate the same parts in both figures of the drawings.

Reference-letter A indicates the center piece, which is composed of suitable material—such, for instance, as a composition of balata and rubber so compounded as to give sufficient rigidity, while preferably retaining a degree of resiliency under impact. Surrounding the center piece A is a core composed of concentric layers $B'$, $B^2$, and $B^3$. The layers of the core may be composed of suitable material, such as rubber strips, bands, or thread. The inner layer $B'$ is relatively dense, owing to the interstices being smaller, and non-resilient by reason of the windings thereof being under great tension. The intermediate layer $B^2$ of the core is less dense and more elastic than the layer $B'$, owing to the windings being under less tension than the windings of the layer $B'$. The windings of the outer layer $B^3$ of the core are under substantially the same tension as the windings of the inner layer $B'$, thereby rendering the inner and outer layers of the core of approximately the same density.

C indicates a cover which surrounds the core and which is composed of suitable wear-resisting material, such as balata or gutta-percha.

The golf-ball embodying my invention as above described possesses to a great degree the advantage that it may be driven a great distance by a hard blow, owing to the less tension and greater resiliency of the intermediate layer of the core relatively to the outer and inner layers. The flight of a ball so constructed is longer than one in which the portions of the core corresponding to layers $B'$ and $B^2$ are of soft solid rubber or of rubber strips loosely tensioned throughout, as the disparity in density and resiliency between such soft core and the more dense surrounding portion of the ball is so great as to produce a disparity in the rate of vibration of the particles under impact in the two portions of the core, which is unfavorable to the flight of the ball.

Another advantage possessed by my improved golf-ball is that the great tension and non-resiliency of the layer of the core adjacent the cover prevents the ball from being driven more than a short distance when it receives a light stroke.

The soft intermediate layer of the core permits a sufficient compression to the outer layer of the core under impact to minimize the liability of the cutting or fracturing of the cover, as the displacement is transferred gradually through the relatively dense layer to the less dense and more resilient adjacent inner layer, with the result that the cover yields sufficiently to prevent cutting, while for the same reason the cover is less liable to fracture than is the case in a ball in which the rubber core is wound to the limit of the elasticity of the rubber throughout.

The center piece A is preferably compounded of rubber, balata, and other materials to secure such quality of elasticity as not to respond to light pressure, but under heavy impact to possess such resiliency as to be favorable to long driving without interfering with the steadiness of the ball on the "putting-green" and in short shots.

From the foregoing description it will be observed that I have invented an improved golf-ball which is capable of being driven a maximum distance by a hard blow, while it will be impelled only a short distance by a light blow, which will not become permanently distorted by usage, and which will possess a minimum liability of being injured by the cutting or fracturing of its cover.

Having now fully described my invention, what I claim as new, and desire to secure by Letters Patent, is—

1. In a golf-ball, the combination with a core composed of windings arranged in layers the inner and outer layers being wound under greater tension than the intermediate layer, and a cover inclosing said core.

2. In a golf-ball, the combination with a center piece, of a core composed of windings arranged in layers, the tension of the layer adjacent the center piece and that of the outer layer being greater than the tension of the windings of the intermediate layer, and a cover surrounding said core.

In testimony whereof I sign this specification in the presence of two witnesses.

WILLIAM I. THOMAS.

Witnesses:
GEO. L. WILKENSON,
MARGARET McDERMOTT.